(12) United States Patent
Velayudhan Pillai et al.

(10) Patent No.: US 10,515,029 B2
(45) Date of Patent: Dec. 24, 2019

(54) CONVERSION TOOL FOR MOVING FROM BLOCK-BASED PERSISTENCE TO BYTE-BASED PERSISTENCE

(71) Applicant: VMware, Inc., Palo Alto, CA (US)

(72) Inventors: Vijaychidambaram Velayudhan Pillai, Austin, TX (US); Irina Calciu, Palo Alto, CA (US); Himanshu Chauhan, Austin, TX (US); Eric Schkufza, Oakland, CA (US); Onur Mutlu, Zurich (CH); Pratap Subrahmanyam, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 347 days.

(21) Appl. No.: 15/356,460

(22) Filed: Nov. 18, 2016

(65) Prior Publication Data
US 2018/0143839 A1    May 24, 2018

(51) Int. Cl.
*G06F 13/36* (2006.01)
*G06F 13/16* (2006.01)
*G06F 8/76* (2018.01)

(52) U.S. Cl.
CPC ............ *G06F 13/1673* (2013.01); *G06F 8/76* (2013.01)

(58) Field of Classification Search
None
See application file for complete search history.

(56) References Cited

U.S. PATENT DOCUMENTS

| | | | | |
|---|---|---|---|---|
| 5,432,942 A | * | 7/1995 | Trainer | G06F 11/3608 714/E11.209 |
| 6,470,494 B1 | * | 10/2002 | Chan | G06F 9/445 717/139 |
| 6,490,695 B1 | * | 12/2002 | Zagorski | G06F 11/362 707/999.002 |
| 7,810,069 B2 | * | 10/2010 | Charisius | G06F 8/20 717/106 |
| 8,161,548 B1 | * | 4/2012 | Wan | G06F 21/566 713/188 |
| 2014/0258187 A1 | * | 9/2014 | Suleiman | G06N 20/00 706/12 |

OTHER PUBLICATIONS

"Pmem redis.", GitHub, www.github.com/pmem/redis, 5 pages.
M. Caulfield et al, "Moneta: A High-performance Storage Array Architecture for Nex-generation, Non-volatile Memories", Proceedings of the 2010 43rd Annual IEEE/ACM International Symposium on Microarchitecture, Dec. 8, 2010, 11 pages.
Chakrabarti et al, "Atlas: Leveraging Locks for Non-volatile Memory Consistency", Proceedings of the 2014 ACM International Conference on Object Oriented Programming Systems Languages & Applications, OOPSLA '14, Oct. 20, 2014, 14 pages.

(Continued)

*Primary Examiner* — Henry Tsai
*Assistant Examiner* — Dean Phan

(57) ABSTRACT

Techniques for facilitating conversion of an application from a block-based persistence model to a byte-based persistence model are provided. In one embodiment, a computer system can receive source code of the application and automatically identify data structures in the source code that are part of the application's semantic persistent state. The computer system can then output a list of data types corresponding to the identified data structures.

18 Claims, 3 Drawing Sheets

(56) References Cited

OTHER PUBLICATIONS

Leon Chua, "Resistance switching memories are memristors", Applied Physics A, University of California, Jan. 28, 2011, 19 pages, Berkeley, CA.

Coburn et al, "NV-Heaps: Making Persistent Objects Fast and Safe with Next-Generation, Non-Volatile Memories", Proceedings of the ACM SIGOPS 22nd Symposium on Operating Systems Principles, Proceedings of the Sixteenth International Conference on Architectural Support for Programming Languages and Operating Systems, ASPLOS XVI, Mar. 5, 2011, 13 pages.

Condit et al, "Better I/O Through Byte-Addressable, Persistent Memory", Proceedings of the ACM SIGOPS 22nd Symposium on Operating Systems Principles, Oct. 11, 2009, 14 pages.

Cooper et al, "Benchmarking Cloud Serving Systems with YCSB", Proceedings of the 1st ACM symposium on Cloud Computing, Jun. 10, 2010, 12 pages.

Herlihy et al, "Transactional Memory: Architectural Support for Lock-Free Data Structures", ISCA '93 Proceedings of the 20th annual international symposium on computer architecture, May 16, 1993, 12 pages.

Ho et al, "Nonvolatile Memristor Memory: Device Characteristics and Design Implications", Proceedings of the 2009 International Conference on Computer-Aided Design, Nov. 2, 2009, 6 pages.

Kultursay et al, "Evaluating STT-RAM as an Energy-Efficient Main Memory Alternative", Proceedings of the IEEE International Symposium on Performance Analysis of Systems and Software, Apr. 2013, 13 pages.

Stefan Lai, "Current status of the phase change memory and its future", In "Electron Devices Meeting, 2003", IEEE International, Dec. 2013, 4 pages.

Chris Lattner, "LLVM and Clang: Next generation compiler technology", In "The BSD Conference", May 17, 2008, 33 pages.

Lee et al, "Architecting Phase Change Memory As a Scalable DRAM Alternative", In "Proceedings of the 36th Annual International Symposium on Computer Architecture", Jun. 2009, 12 pages.

Lu et la, "Loose-ordering consistency for persistent memory", In 2014 IEEE 32nd International Conference on Computer Design (ICCD), Oct. 2014, 8 pages.

Macedo et al, "Redis Cookbook", O'Reilly Media, Inc., printed Aug. 2011, 72 pages.

Moraru et al, "Consistent, durable, and safe memory management for byte-addressable non volatile main memory", In "Proceedings of the First ACM SIGOPS Conference on Timely Results in Operating Systems", Nov. 3, 2013, 17 pages.

Pelley et al, "Memory Persistency", In ACM/IEEE 41st International Symposium on Computer Architecture (ISCA), Jun. 2014, 12 pages.

Pillai et al, "All File Systems Are Not Created Equal: On the Complexity of Crafting Crash-Consistent Applications", In "Proceedings of the 11th Symposium on Operating Systems Design and Implementation (OSDI '14)", Oct. 2014, 17 pages, Broomfield, CO.

Pillai et al, "Crash Consistency", In "Queue Magazine", vol. 13 Issue 7, Jul. 2015, 9 pages.

Raoux et al, "Phase-change random access memory: A scalable technology", IBM Journal of Research and Development, Jul. 2008, 16 pages.

Ren et al, "ThyNVM: Enabling Software-Transparent Crash Consistency in Persistent Memory Systems", In "Proceedings of the 48th International Symposium on Microarchitecture", Dec. 2015, 14 pages.

Strukov et al, "The missing memristor found", In "Nature", vol. 453, May 1, 2008, 4 pages.

Annalyn Kurtz, "Delta Malfunction on Land Keeps a Fleet of Planes From the Sky", downloaded from http://www.nytimes.com/2016/08/09/business/delta-air-lines-delays-computer-failure.html, Aug. 2016, 6 pages.

Venkataraman et al, "Consistent and Durable Data Structures for Non-Volatile Byte-Addressable Memory", In "Proceedings of the 9th Conference on File and Storage Technologies (Fast '11)", Feb. 2011, 15 pages.

Volos et al, "Mnemosyne: Lightweight Persistent Memory", In "Proceedings of the Sixteenth International Conference on Architectural Support for Programming Languages and Operating Systems, ASPLOS XVI", Mar. 2011, 13 pages.

Wong et al, "Phase Change Memory", Proceedings of the IEEE, vol. 98, No. 12, Dec. 2010, pp. 2201-2227.

Xue et al, "Emerging Non-Volatile Memories: Opportunities and Challenges", In "Proceedings of the seventh IEEE/ACM/IFIP International Conference on Hardware/Software Codesign and System Synthesis", Oct. 2011, pp. 325-334.

Jeremy Zawodny, "Redis: Lightweight key/value Store That Goes the Extra Mile", Linux Magazine, Aug. 31, 2009.

* cited by examiner

CONVERSION TOOL FOR MOVING FROM BLOCK-BASED PERSISTENCE TO BYTE-BASED PERSISTENCE

BACKGROUND

Traditional software applications that rely on persistent state (i.e., state information that is saved across multiple program executions) store their data in volatile memory such as DRAM for fast access and periodically persist the data to a non-volatile storage device such as a magnetic hard disk, solid-state disk, etc. via a block-based interface. This model of persistence is known as block-based persistence (BlP). With BlP, the data structures maintained in volatile memory generally need to be serialized when persisting the data to non-volatile storage and de-serialized when reconstructing the data in volatile memory during an application restart or crash recovery. These serialization and de-serialization processes can be time-consuming, computationally intensive, and error prone.

Non-volatile byte-addressable memory (NVM) is an emerging memory technology that offers fast, fine grained access to data in a manner similar to DRAM, but is non-volatile in nature like conventional block-based storage. Examples of NVM technologies that are currently available or expected to be available in the near future include phase change memory (PCM), memristors, spin-torque transfer, and 3D XPoint. The unique characteristics of NVM enable an alternative model of persistence, known as byte-based persistence (ByP), in which an application can directly access (via, e.g., memory load/store instructions) a single version of its data in NVM that remains available after application termination. Thus, upon a restart or crash recovery, the application can simply continue accessing its data from NVM, without requiring an expensive reload and de-serialization of data structures from a block-based storage device.

One hurdle to the widespread adoption of NVM involves converting existing (i.e., legacy) software applications from the BlP model to the ByP model. The first step in this conversion is identifying which data structures in a legacy BlP application should be made persistent (e.g., placed in NVM) in the converted ByP application. However, this identification is not easy to do. One known approach is for the application's developer to manually review the codebase of the legacy BlP application, understand how each data structure in the application is used, and determine whether it semantically represents a data structure that should be maintained across multiple program executions or not. But, while this manual approach may be feasible for very small-scale conversion projects, it is not practical for medium to large-scale conversion projects due to the amount of developer time and effort that would be required.

DETAILED DESCRIPTION

Figure 1:
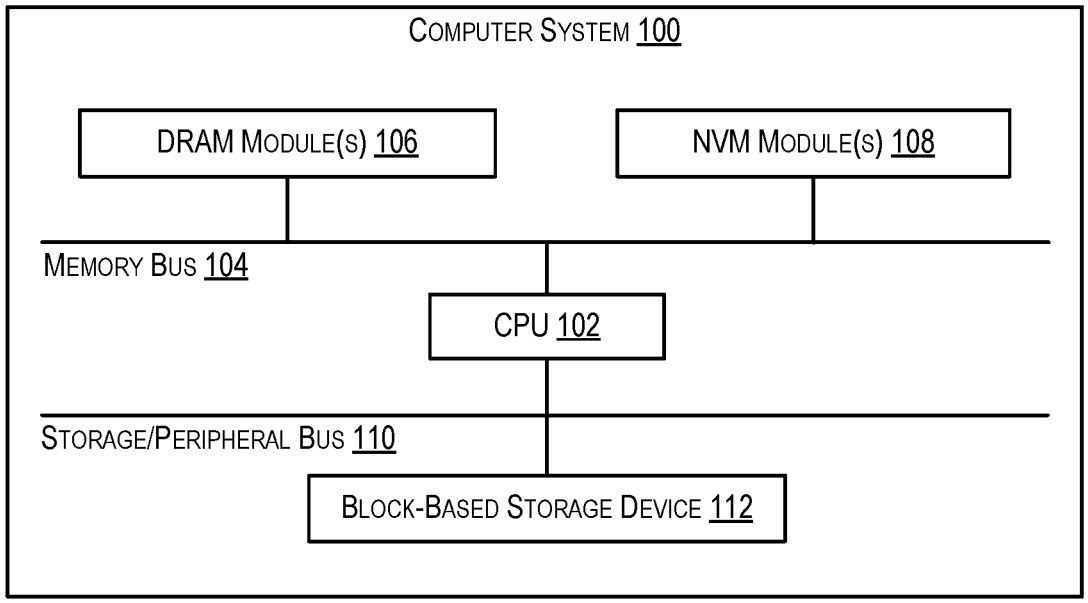
FIG. 1 depicts a computer system that implements NVM according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof

1. Overview

Embodiments of the present disclosure provide a tool, referred to herein as "NVM-Assist," that facilitates the conversion of applications from a block-based persistence (BlP) model to a byte-based persistence (ByP) model. For example, in one set of embodiments, NVM-Assist can receive as input the source code of an application that uses BlP (i.e., a "BlP application") and can automatically identify data structures in the source code that represent the application's semantic persistent state (in other words, state that should be persisted across multiple application executions to ensure correct operation of the application). NVM-Assist can then output a list of data types corresponding to those data structures and optionally where the data types are defined in the source code, which can aid the application's developer in rewriting the source code to implement ByP.

With NVM-Assist, the amount of development time and effort required to update legacy BlP applications to support ByP can be significantly reduced, since there is no need for developers to manually analyze their source code in order to determine which data structures should be made persistent under the ByP model. Instead, NVM-Assist can perform this analysis in an automated fashion. Thus, NVM-Assist can make it easier for developers to efficiently leverage NVM, which in turn can accelerate the uptake and adoption of NVM technologies.

In certain embodiments, in addition to receiving as input the source code of a BlP application, NVM-Assist can receive as input the definition of a top-level load function that the application uses to load data into memory from a block-based storage device upon application restart or recovery. NVM-Assist can use this load function as a starting point for walking through the application source code (by, e.g., following a call graph with the load function at the root of the graph) and thereby identify the data structures that are part of the application's semantic persistent state.

In further embodiments, beyond simply outputting a list of data types that should be persisted, NVM-Assist can also output other types of information and/or perform other steps that can facilitate the BlP-to-ByP conversion process. For instance, in one embodiment, NVM-Assist can output a list of the persistent data structures (rather than data types) of the application, as well as the locations (e.g., source code filenames and line numbers) where each of those data structures are modified. In another embodiment, NVM-Assist can autonomously rewrite certain portions of the application source code so that it conforms to the ByP model (e.g., remove serialization/deserialization of persistent data structures, insert code for correct interaction with NVM, etc.). These and other aspects of the present disclosure are described in further detail in the sections that follow.

2. Example Computer System and High-Level NVM-Assist Design

To provide context for the NVM-Assist tool described herein, FIG. 1 depicts an example computer system 100 that implements NVM according to an embodiment. As shown, computer system 100 includes a central processing unit (CPU) 102 that is connected via a memory bus 104 to one or more DRAM module(s) 106 and one or more NVM module(s) 108. As mentioned previously, NVM is an emerging type of memory that allows fast, fine grained access to data like DRAM, but is non-volatile in nature. In addition to DRAM module(s) 106 and NVM module(s) 108, CPU 102 is connected via a storage or peripheral bus 110 to a conventional, block-based storage device (e.g., a magnetic hard disk or solid-state disk) 112.

As noted in the Background section, NVM 108 advantageously enables software applications running on computer system 100 to implement a byte-based persistence (ByP) model in which the applications directly load/store data to NVM 108 for execution and durability purposes, without needing to perform any serialization or de-serialization of the data to/from block-based storage device 112. However, the task of converting existing applications that have been designed under the BlP paradigm to adopt ByP can be time-consuming and difficult.

Figure 2:
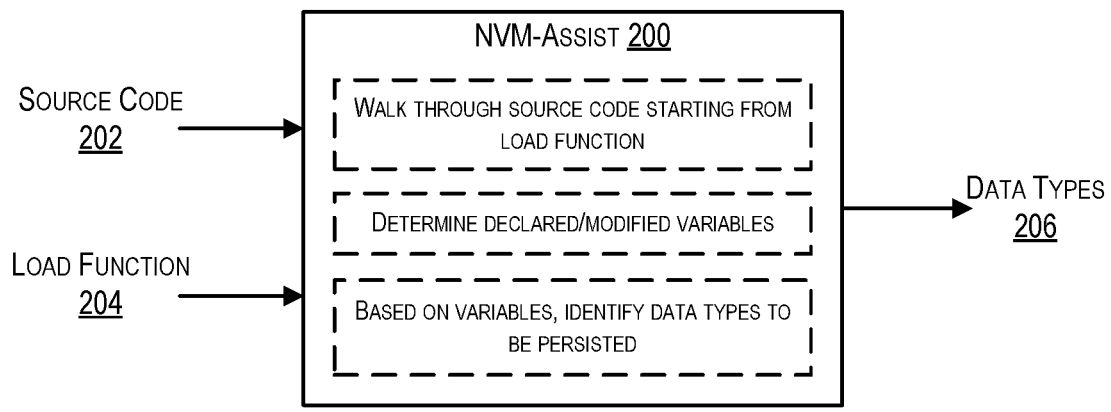
FIG. 2 depicts the high-level design of NVM-Assist according to an embodiment.

To address this, embodiments of the present disclosure provide a novel NVM-Assist tool 200 as shown in FIG. 2. NVM-Assist 200 can be implemented in software, hardware, or a combination thereof. At a high level, NVM-Assist 200 can take as input source code 202 of a BlP application and, in certain embodiments, a definition of a top-level load function 204 that is configured to load persistent application state from a storage device upon application initialization or recovery from a failure. This function definition can be provided by, e.g., a developer of the application.

NVM-Assist 200 can then use the input information to walk through source code 202 starting from the load function, determine the variables declared/modified therein, and based on those variables, identify data types in source code 202 that are candidates for persistence under the ByP model. The rationale behind walking through the source code starting from load function 204 is that any application which persists semantic state to storage must reload that semantic state into volatile memory upon a restart or failure recovery; accordingly, any data structure that is updated/modified during load function 204 (or a downstream function call) is very likely to part of the application's semantic persistent state, rather than merely the application's "syntactic persistent state" (e.g., intermediary/temporary buffers, iterators, and the like).

Finally, the tool can output a list 206 of the identified data types and optionally where those data types are defined in source code 202. The developer of the BlP application can subsequently use list 206 as a reference point for rewriting the application to implement ByP. Additional details regarding the high-level process shown in FIG. 2 are described in section (3) below.

By way of example, consider the following code listing, which is an example of a BlP program:

---
Code Listing 1
---

```
1: struct example f
2: int x;
3: long long y;
4: g;
5: typedef struct example mytype;
6: function UPDATE AND PERSIST(mytype* t, int a,long long b)
7: /* Updating structure */
8: t !x = a;
9: t !y = b;
10: /* Persisting to block-based storage. */
11: char* buf = malloc(sizeof(mytype));
12: int fd = open("data", O WRITE);
13: memcpy(buf, t, sizeof(mytype));
14: write(fd, buf, sizeof(mytype));
15: free(buf);
16: close(fd);
17: end function
```

In this program, the user-defined data type struct example is declared and an instance of this data type (mytype) is allocated, modified, serialized, and persisted to a block-based storage device using the system calls memcpy and write. Note that there is also a deserialization step needed when reading the mytype data structure from the block device (not shown).

If this program were provided as input to NVM-Assist 200 of FIG. 2, NVM-Assist 200 could analyze the source code, identify mytype as being part of the semantic persistent state of the program, and provide struct example (i.e., the data type of mytype) as its output, indicating that instances of struct example should be persisted. With this information, the developer of the program could then make appropriate changes to the source code associated with mytype to directly load/store this data structure in NVM, thereby enabling the program to efficiently leverage the capabilities of NVM-based systems such as computer system 100 of FIG. 1.

3. NVM-Assist Implementation

Figure 3:
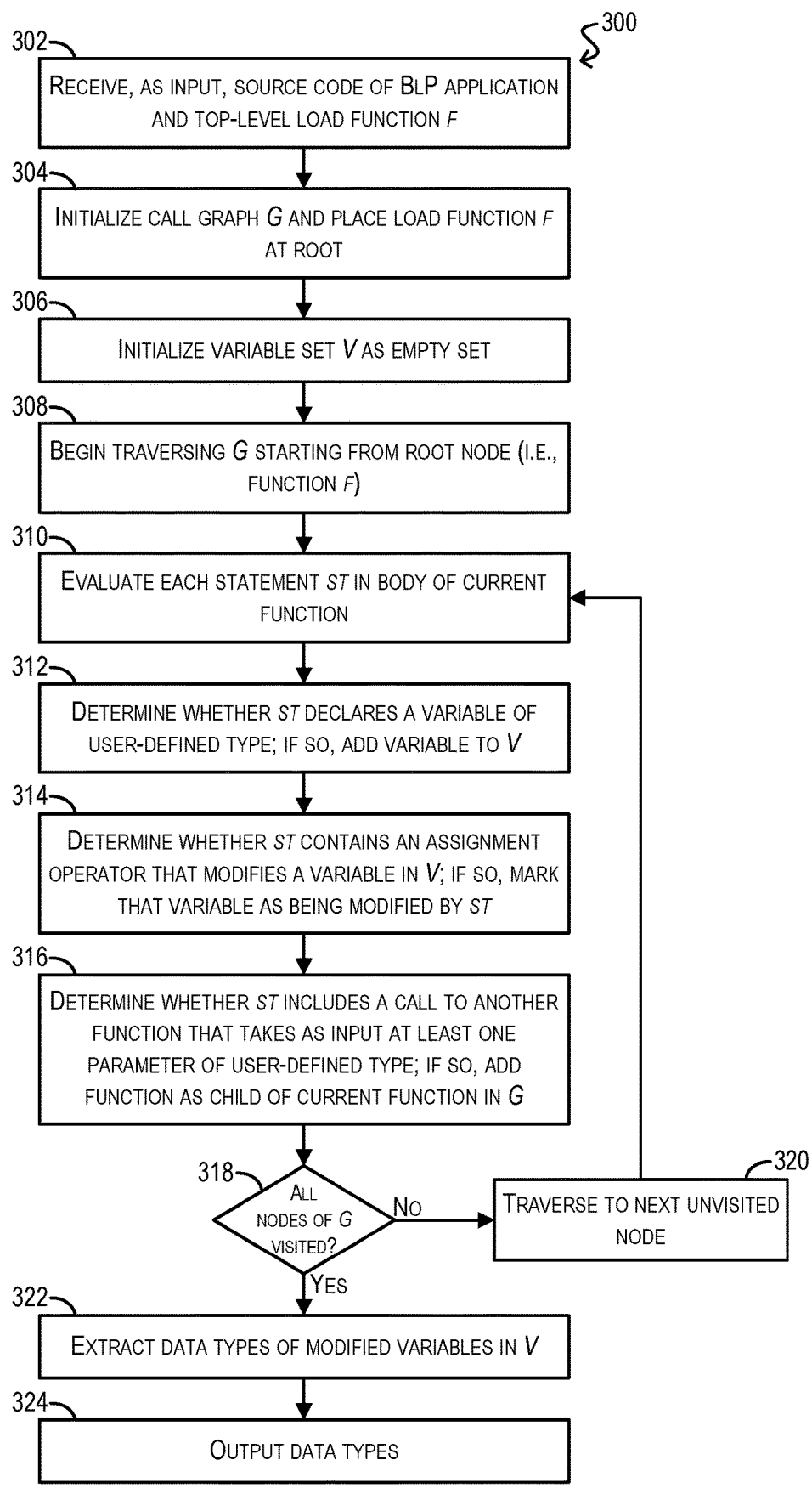
FIG. 3 depicts a flowchart of an NVM-Assist implementation according to an embodiment.

FIG. 3 depicts a flowchart 300 illustrating one possible implementation of the processing attributed to NVM-Assist 200 in FIG. 2 according to an embodiment. Starting with block 302, NVM-Assist can receive as input the source code for a BlP application and a definition of a top-level load function $f$ for the application. As mentioned previously, load function $f$ can correspond to a function that is invoked by the BlP application during an initialization phase (e.g., after an application restart or recovery from a crash/failure) in order to load state information that was previously persisted to a block-based storage device.

At block 304, NVM-Assist can initialize a call graph G and place the load function $f$ at the root of the graph. As used herein, a call graph is a graph which represents calling relationships between functions in a computer program. Each node of the graph represents a function and each edge between two functions $\eta 1$ and $\eta 2$ indicates that $\eta 1$ calls $\eta 2$.

At block 306, NVM-Assist can initialize a variable set V as an empty set.

Upon initializing call graph G and variable set V, NVM-Assist can begin traversing call graph G starting from the root node corresponding to load function $f$ (block 308) and, at block 310, can evaluate each statement st in the body of the current function (i.e., initially load function $\eta$). As part of this evaluation, NVM-Assist can determine whether st declares a variable that is of a non-trivial (e.g., user-defined) type; if so, NVM-Assist can add the variable to variable set V (block 312).

Further, NVM-Assist can determine whether st contains an assignment operator that modifies any variable in variable set V. If so, NVM-Assist can mark that variable as being modified by st (block 314).

Yet further, NVM-Assist can determine whether st includes a call to another function that takes as input at least one parameter of non-trivial type. If so, NVM-Assist can add this function as a child of the current function in call graph G (block 316).

Upon processing all of the statements in the current function per blocks 310-316, NVM-Assist can check whether all of the nodes in call graph G have been visited (block 318). If not, NVM-Assist can traverse to the next unvisited node (block 320) and can repeat blocks 310-316 for the function corresponding to that node.

On the other hand, if NVM-Assist determines that all nodes of G have been visited at block 318, NVM-Assist can conclude that its analysis is finished and that variable set V includes all user-defined data structures that were modified during the application's initialization phase (and thus highly likely to be part of the application's semantic persistent state). Thus, at blocks 322 and 324, NVM-Assist can extract the data type of each modified variable in V (note that many variables in V may have the same data type) and can output a list of these data types. NVM-Assist may also output the locations where the data types are defined in the application source code. Flowchart 300 can then end.

It should be appreciated that flowchart 300 of FIG. 3 is illustrative and various modifications are possible. For example, although flowchart 300 assumes that NVM-Assist receives a single top-level load function $f$ as input, in some embodiments NVM-Assist may receive multiple top-level load functions. This may be the case if the BlP application invokes several separate functions during its initialization. In these scenarios, NVM-Assist can repeat the processing of flowchart 300 for each top-level function.

As another example, while flowchart 300 indicates that the end result of the processing performed by NVM-Assist is a list of data types, in some embodiments NVM-Assist may also output other types of information or perform other actions in order to facilitate the conversion of the application from BlP to ByP.

For instance, in one embodiment NVM-Assist may output (in addition to or in lieu of the list of data types) a list of the specific data structures that are identified by NVM-Assist as being part of the application's semantic persistent state. In this embodiment, NVM-Assist may also output the locations where those data structures have been modified in the source code.

In another embodiment, NVM-Assist may autonomously rewrite appropriate portions of the application source code (e.g., the functions that define/modify the data structures included in variable set V) in order to conform to the ByP model. This rewriting can involve, e.g., allocating the data structures from a non-volatile heap (rather than a volatile heap), directly updating the fields of each data structure without any system calls or serialization/deserialization, adding appropriate crash recovery code, and so on. In this way, NVM-Assist can completely automate the conversion process.

One of ordinary skill in the art will recognize other possible variations and modifications for flowchart 300 of FIG. 3.

4. Alternative Implementation

The NVM-Assist implementation described in section (3) above and shown in FIG. 3 is based on the assumption that each BlP application has a top-level load function to initialize data from a block-based storage device after an application restart or recovery. This assumption works well because most applications based on BlP need to initialize their application data from persistent storage and do so in a well-structured fashion.

Figure 4:
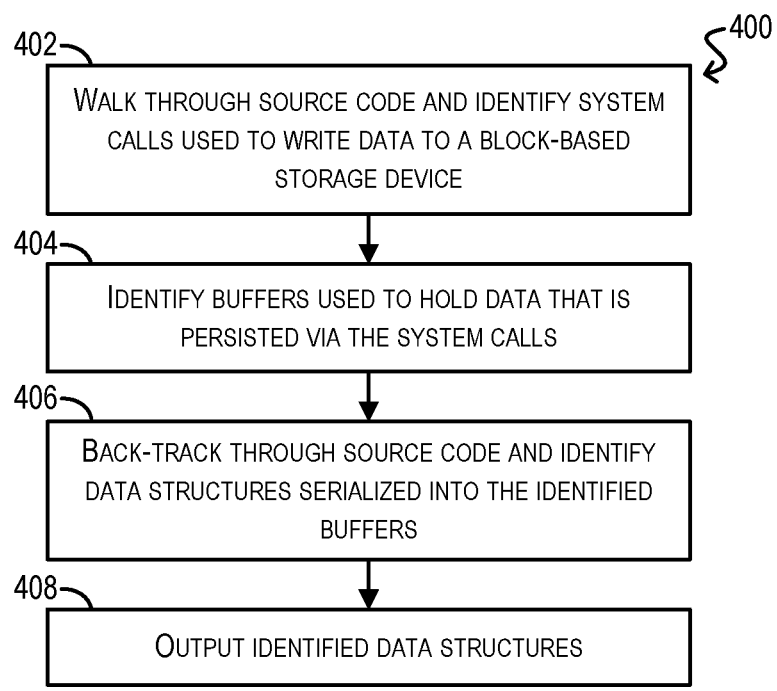
FIG. 4 depicts a flowchart of an alternative NVM-Assist implementation according to an embodiment.

One alternative approach that does not rely on receiving a top-level load function as input involves investigating the data that is persisted to disk using system calls such as write or fwrite. A high-level flowchart 400 of this alternative approach is shown in FIG. 4.

At block 402, NVM-Assist can walk through the source code of a BlP application and can identify system calls that are used to write data to a block-based storage device. In the C programming language, examples of such system calls include write( ) and pwrite( ).

Upon identifying these system calls, NVM-Assist can identify the buffers that were used to hold the data that was persisted via the system calls (block 404). For example, in code listing 1 shown previously, NVM-Assist would identify the buffer buf.

Finally, at blocks 406 and 408, NVM-Assist can backtrack through the application source code, identify the data structures that were serialized into the identified buffers, and output this list of data structures.

The main advantage of the approach of FIG. 4 is that it does not require any guidance at all from the application developer (in terms of providing a load function) in order to identify the persistent data structures of the application. However, in some cases this approach can result in a larger number of false positives (i.e., the identification of data structures that are not actually part of the application's semantic persistent state) than the approach shown in FIG. 3. This is because write( ) system calls (and other similar system calls) are not only used to write semantic persistent state to a block-based storage device; they are also commonly used to write debug information, perform writes to pipes, perform writes to network sockets, and so on. Thus, in some cases, the approach of FIG. 4 may identify a large number of data structures that should not actually be persisted.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for facilitating conversion of an application from a block-based persistence model to a byte-based persistence model, the method comprising:
   receiving, by a computer system, source code of the application;
   automatically identifying, by the computer system in the source code, data structures which hold semantic state that is used by the application and is persisted across multiple executions of the application, wherein the automatically identifying comprises:
      determining one or more variables in the source code that are modified during a load function of the application or a downstream function called by the load function, the load function being a function used by the application for loading data from a block-based storage device; and
      identifying the data structures based on the one or more determined variables; and
   outputting, by the computer system, a list of data types corresponding to the identified data structures.

2. The method of claim 1 wherein the determining comprises:
   traversing the source code starting from the load function.

3. The method of claim 2 wherein the determining further comprises, for each statement encountered during the traversing:
   if the statement declares a variable of a user-defined type, add the variable to a variable set;
   if the statement contains an assignment operator that modifies a variable in the variable set, mark the variable as being modified by the statement; and
   if the statement includes a call to another function, add said another function as a child of the load function in a call graph of the application.

4. The method of claim 3 wherein the list of data types are extracted from the variables in the variable set that are marked as modified.

5. The method of claim 1 further comprising:
   outputting locations in the source code where the list of data types are defined.

6. The method of claim 1 further comprising:
   automatically rewriting portions of the source code that reference the identified data structures in order to support the byte-based persistence model.

7. A non-transitory computer readable storage medium having stored thereon program code executable by a computer system, the program code embodying a method for facilitating conversion of an application from a block-based persistence model to a byte-based persistence model, the method comprising:
   receiving source code of the application;
   automatically identifying, in the source code, data structures which hold semantic state that is used by the application and is persisted across multiple executions of the application, wherein the automatically identifying comprises:
      determining one or more variables in the source code that are modified during a load function of the application or a downstream function called by the load function, the load function being a function used by the application for loading data from a block-based storage device; and
      identifying the data structures based on the one or more determined variables; and
   outputting a list of data types corresponding to the identified data structures.

8. The non-transitory computer readable storage medium of claim 7 wherein the determining comprises:
   traversing the source code starting from the load function.

9. The non-transitory computer readable storage medium of claim 8 wherein the determining further comprises, for each statement encountered during the traversing:
   if the statement declares a variable of a user-defined type, add the variable to a variable set;
   if the statement contains an assignment operator that modifies a variable in the variable set, mark the variable as being modified by the statement; and
   if the statement includes a call to another function, add said another function as a child of the load function in a call graph of the application.

10. The non-transitory computer readable storage medium of claim 9 wherein the list of data types are extracted from the variables in the variable set that are marked as modified.

11. The non-transitory computer readable storage medium of claim 7 wherein the method further comprises:
   outputting locations in the source code where the list of data types are defined.

12. The non-transitory computer readable storage medium of claim 7 wherein the method further comprises:
   automatically rewriting portions of the source code that reference the identified data structures in order to support the byte-based persistence model.

13. A computer system comprising:
   a processor; and
   a non-transitory computer readable medium having stored thereon program code for facilitating conversion of an application from a block-based persistence model to a byte-based persistence model, the program code causing the processor to:
      receive source code of the application;
      automatically identify, in the source code, data structures which hold semantic state that is used by the application and is persisted across multiple executions of the application, wherein the automatically identifying comprises:

determining one or more variables in the source code that are modified during a load function of the application or a downstream function called by the load function, the load function being a function used by the application for loading data from a block-based storage device; and identifying the data structures based on the one or more determined variables; and output a list of data types corresponding to the identified data structures.

14. The computer system of claim 13 wherein the determining comprises:

traversing the source code starting from the load function.

15. The computer system of claim 14 wherein the determining further comprises, for each statement encountered during the traversing:

if the statement declares a variable of a user-defined type, add the variable to a variable set;

if the statement contains an assignment operator that modifies a variable in the variable set, mark the variable as being modified by the statement; and if the statement includes a call to another function, add said another function as a child of the load function in a call graph of the application.

16. The computer system of claim 15 wherein the list of data types are extracted from the variables in the variable set that are marked as modified.

17. The computer system of claim 13 wherein the program code further causes the processor to:

output locations in the source code where the list of data types are defined.

18. The computer system of claim 13 wherein the program code further causes the processor to:

automatically rewrite portions of the source code that reference the identified data structures in order to support the byte-based persistence model.

* * * * *